US012797290B2

(12) United States Patent
Gleixner

(10) Patent No.: US 12,797,290 B2
(45) Date of Patent: Nov. 17, 2026

(54) MULTI-PART DEVICE

(71) Applicant: INOTECH Kunststofftechnik GmbH, Nabburg (DE)

(72) Inventor: Josef Gleixner, Nabburg (DE)

(73) Assignee: INOTECH Kunststofftechnik GmbH, Nabburg (DE)

( * ) Notice: Subject to any disclaimer, the term of this patent is extended or adjusted under 35 U.S.C. 154(b) by 1203 days.

(21) Appl. No.: 17/755,923

(22) PCT Filed: Nov. 20, 2019

(86) PCT No.: PCT/EP2019/081901
§ 371 (c)(1),
(2) Date: May 11, 2022

(87) PCT Pub. No.: WO2021/093981
PCT Pub. Date: May 20, 2021

(65) Prior Publication Data

US 2022/0387254 A1 Dec. 8, 2022

(30) Foreign Application Priority Data

Nov. 14, 2019 (DE) ......................... 102019130809.7

(51) Int. Cl.
*A61H 31/00* (2006.01)
*G08B 3/10* (2006.01)

(52) U.S. Cl.
CPC ............. *A61H 31/006* (2013.01); *G08B 3/10* (2013.01); *A61H 2201/5048* (2013.01)

(58) Field of Classification Search
CPC .................................................... A61H 31/006
See application file for complete search history.

(56) References Cited

U.S. PATENT DOCUMENTS

| | | | |
|---|---|---|---|
| 4,554,910 | A | 11/1985 | Lally |
| 10,893,999 | B2 | 1/2021 | Gleixner |
| 2016/0128898 | A1 | 5/2016 | Hagl et al. |

FOREIGN PATENT DOCUMENTS

| | | | |
|---|---|---|---|
| CN | 102537164 | A | 7/2012 |
| CN | 104870145 | A | 8/2015 |
| CN | 106714763 | A | 5/2017 |
| CN | 106969087 | A | 7/2017 |
| CN | 208085379 | U | 11/2018 |
| WO | 2014071915 | A2 | 5/2014 |
| WO | 2016087070 | A1 | 6/2016 |
| WO | 2018160709 | A1 | 9/2018 |

*Primary Examiner* — LaToya M Louis
(74) *Attorney, Agent, or Firm* — AVEK IP, LLC; Kent R. Erickson

(57) ABSTRACT

The present invention relates to a multi-part device for generating a clearly audible sound when an external force is applied onto a first force-transmission means that acts, via a spring system, on a base plate in an apparatus for controlled cardiopulmonary resuscitation of the human body in the event of cardiac arrest, and is characterised in that the external geometric dimensions and shapes are adapted to the anatomical conditions of the pectoral-adjacent thorax, in particular the spring system generating a signal that acts on at least one oscillatable element, the spring system being arranged between the first force-transmission means and the base plate, which spring system consists substantially of at least one spring element and one planar spring element, in particular the spring element also being a conical spring element.

10 Claims, 4 Drawing Sheets

MULTI-PART DEVICE

CROSS-REFERENCE TO RELATED APPLICATIONS

This application claims priority from German patent application No. DE 10 2019 130 809.7 filed Nov. 14, 2019, the disclosure of which is hereby incorporated herein in its entirety by reference.

FIELD OF THE INVENTION

The present invention relates to a multi-part device for the controlled cardio-pulmonary resuscitation in the event of cardiac arrest with a clearly audible signal when reaching a limit force, which acts on the thorax of the human body, in particular a device, comprising a special spring design and shaping, which facilitates the treatment of a patient in the case of acute application. The present application furthermore relates to a method for generating a clearly audible sound, in particular according to the preamble of claim 10.

BACKGROUND

Devices of this type are known from WO 2014/071915 A2 in the prior art. This document discloses a device for the cardio-pulmonary resuscitation in the event of cardiac arrest comprising at least one pressure transmission means, and at least one pressure absorbing element, and a pressure gauge, which generates a signal, which can be perceived by human sensory organs, when a mechanical limit pressure ($F_{max}$) sets in. A spring system comprising two different springs is arranged between the at least one pressure transmission means and the at least one pressure absorbing element, which spring system, when reaching a predetermined limit pressure, generates an audible first click signal by means of one of the two springs, and which generates a second click signal when the limit pressure weakens. The disadvantage of this invention has proven to be that the transmission of the click signal does not ring out sufficiently clearly because the generated signal experiences an excessive attenuation of the transmission to the outside.

DE102014014074A1 shows a device for the controlled cardio-pulmonary resuscitation, which is capable of being able to perform a quick and uncomplicated resuscitation of a human body in the event of cardiac arrest. The geometric dimensions of the device according to the invention are comparatively small and lie approximately between 10 and 25 cm in diameter and approx. 6 to 12 cm in height. When in use, a force K is exerted cyclically on a first pressure transmission means, and when reaching a maximum exertion of force $K_{max}$, a clearly audible signal is generated, which is effected as a result of the cooperation of spring elements, which are arranged essentially between the first force transmission means and a base plate.

With respect to the required installation space, however, this device for generating a clearly audible sound when an external force (K) acts on a first force transmission means requires slightly too much space from time to time.

A further resuscitation apparatus comprising a pressure gauge has further become known from U.S. Pat. No. 4,554,910, which generates first and second acoustic click signals by means of a u-shaped leaf spring, which is arranged approximately in the middle of a second spring and which is formed as helical spring. It is perceived to be a disadvantage of an apparatus of this type for the cardio-pulmonary resuscitation in the event of cardiac arrest that the mechanical pressure has to always act centrally on the pressure transmission means, in order to attain the desired effect for the resuscitation. This is not possible in the practical use.

A similar elongated apparatus has become known from CN 201304070 Y, which also has two pressure transmission means, between which a helical spring is arranged, and which generates an audible signal when reaching a limit pressure, and signals to the user to relieve the pressure transmission means again. It is perceived to be a disadvantage of this apparatus that it is difficult to obtain a stable position on the chest in case of emergency.

The publication WO 2006/101400 A1 further discloses a device for the manual pressure generation on the chest of a human body. This device has a mechanical sound generator, which generates a sound when reaching a predetermined pressure. For this purpose, a plate is brought into a holder, which holds the plate in a curved pre-tension and which generates a sound when pushing through the plate. The pressure measurement itself is performed by means of another mechanism, which is described in more detail in WO 2004/056303 A1. It is perceived to be a disadvantage of a device of this type for the cardio-pulmonary massage that the cooperation of all mechanical components appears to be too complicated as a result of the absolute requirement for functional reliability of a device of this type, so that the desired reliability cannot be ensured.

A portable cardiac massage apparatus has furthermore become known from publication DE 1491611, which consists of a base plate and a plunger arranged thereabove, wherein the plunger is actuated cyclically by means of a pneumatic mechanism and thus acts on the thorax of the human body.

Due to the fact that in the event of cardiac arrest, what is generally important is to perform a resuscitation as quickly as possible, the handling of the available apparatuses is often too complex and operation is too complicated, so that valuable time for the resuscitation of the human body can get lost, which has far-reaching consequences.

It is thus the object of the present invention to avoid the disadvantages from the prior art and to provide an apparatus for the cardiac-pulmonary resuscitation which is simple and which can be operated easily by laypersons in this field, and which is able to allow a controlled, safe, compressive force cyclically on the thorax of the human body, on the one hand, and to generate a clearly audible signal by simple means on the other hand.

This object is solved by means of the characterizing features of the main claims. Further features, which are essential for the invention, can be gathered from the dependent claims and the detailed description.

The present invention provides a device for the controlled cardio-pulmonary resuscitation, which is capable of being able to perform a quick and uncomplicated resuscitation of a human body in the event of cardiac arrest, wherein the device is not only constructed in a simple manner, but is additionally also exceptionally space-saving.

The inventor has also recognized that currently known devices have springs, which follow a linear spring characteristic. Devices are also known, which follow a degressive spring characteristic. However, both designs have a sometimes high starting torque. This could mean that the user has to apply an excessive initial pressure, in order to be able to trigger a spring deflection at all.

It is thus a further aim of the present invention to be able to set a starting torque, in particular such that the starting torque is initially as small as possible and increases progressively in the course of the pressure and spring deflection movement.

This goal can be reached by means of the use of a conical spring, among other things. Rib fractures of the human body can be avoided particularly effectively in this way because the rib structure can slowly adapt and get used to a steadily increasing pressure. According to at least one embodiment, a multi-part device for generating a clearly audible sound when an external force acts on a first force transmission means, which, via a spring system, acts on a base plate in an apparatus for the controlled cardio-pulmonary resuscitation of the human body in the event of cardiac arrest, wherein the outer geometric dimensions and shapes are adapted to the anatomical conditions of the thorax close to the sternum, in particular wherein the spring system generates a signal, which acts on at least one oscillatory element, wherein the spring system is arranged between the first force transmission means and the base plate, which spring system consists essentially of at least one spring element and a flat-formed spring element, in particular wherein the spring element is further a conical spring element.

According to at least one embodiment, the at least one spring element is arranged on a circular path laterally from the flat-formed spring element, which is in particular a click plate.

According to at least one embodiment, the device comprises at least two, preferably at least three, and particularly preferably at least four spring elements, which are in each case arranged laterally from the flat-formed spring element. In the context of the present invention, "arranged laterally" can mean an arrangement of the spring elements in a direction perpendicular to the spring deflection direction of the flat-formed spring element. The circular path thus preferably runs along and within a plane, which is perpendicular to the spring deflection direction of the flat-formed spring element. According to at least one embodiment of the multi-part device, each of the spring elements is a conical spring element.

By using a conical spring element, a starting torque can be set, so that the starting torque is initially as small as possible and increases progressively in the course of the pressure and spring deflection movement.

Rib fractures of the human body can be avoided particularly effectively in this way because the rib structure can slowly adapt and get used to a steadily increasing pressure. According to at least one embodiment of the multi-part device, at least one spring element is conically arranged between the first force transmission means and the base plate in such a way that a spring cross section of the spring element increases or decreases conically, starting at the force transmission means, in the direction towards the base plate. This, in particular, also provides for a particularly effectively reduction in the installation space required in the horizontal direction (within which the circular path can run).

According to at least one embodiment, the multi-part device has only a single spring element, wherein in the radial direction an end of the spring element, which is connected to the base plate, encloses and surrounds the flat-formed spring element in the radial direction. This spring element is preferably arranged along a spring deflection axis of the flat-formed spring element in such a way that a spring cross section of this spring element completely encloses the flat-formed spring element in the horizontal direction. The spring deflection axes of both spring elements are then preferably arranged so as to overlap completely and thus parallel to one another. In other words, the spring element thus encloses the flat-formed spring element in the horizontal direction. A spring cross section of the single spring element is thus larger than a spring cross section of the flat-formed spring element at least in some places, so that the flat-formed spring element is fitted into the spring cross section of the single spring element. An end of the single spring element, which is connected to the base plate, is thus larger than a spring cross section of the flat-formed spring element. In this context, a spring cross section of a spring thereby refers to an expansion of the spring in a direction perpendicular to the spring deflection direction. The single spring element thus forms a central spring element. According to at least one embodiment of the multi-part device, the spring element, which is the further spring element, is arranged between the flat-formed spring element and the force transmission means, so that a pressure applied externally to the force transmission means is at least partially transmitted to the flat-formed spring element via the spring element. This embodiment shows that in addition to the flat-formed spring element and the single spring element, at least one further spring element can also be installed, but then with the above-mentioned structural restrictions.

According to at least one embodiment of the multi-part device, an end of the single spring element, which is connected to the force transmission means, has such a radial cross section that this end encloses and surrounds the spring element in the radial direction. As described above, the central spring element is realized in this way. The central spring element can thus be the single spring element.

According to at least one embodiment of the multi-part device, the device is free from further spring elements away from an axis of symmetry, which runs through the flat spring element in the radial direction.

In addition to the single spring element, however, at least one further spring element can be installed in the device, but which is arranged parallel and along the spring deflection axis of the flat-formed spring element and which neither encloses the flat-formed spring element (as does the single spring element), nor is arranged in the device away from the spring deflection axis of the flat-formed spring element.

According to at least one embodiment of the multi-part device, the spring elements form a signal-generating unit or are at least a part thereof, so that a clicking sound is generated spontaneously when reaching a predetermined deformation in one direction.

The present invention furthermore relates to a method for generating a clearly audible sound, in particular using the above-described device. All of the features disclosed for the device described here are thereby likewise also disclosed for the method described here, and vice versa.

According to at least one embodiment, the method for generating a clearly audible sound when an external force K acts on a first force transmission means, which, via a spring system, acts on a base plate in an apparatus for the controlled cardio-pulmonary resuscitation of the human body in the event of cardiac arrest, is characterized in that a clearly audible signal is generated, which is transmitted to oscillatory elements, by means of the cooperation of the spring system when a settable limit pressure $K_{max}$ is reached.

It is advantageous thereby that a flat, preferably one-piece spring element, which reveals a settable limit force $K_{max}$ under the impact of a mechanical force K, and which spontaneously moves back into the original start position of the spring element again when the force K weakens, wherein, when reaching the limit value $K_{max}$ as well as when moving back into the start position, a clearly audible signal rings out, which acts mechanically as well as acoustically on the surrounding area supporting the spring element.

It is further advantageous that the signal-generating unit has at least one arbitrarily formed click plate comprising at least one curvature, on which at least one oscillatory element acts.

It is furthermore advantageous that the outer shape of the click plate can be formed arbitrarily, e.g. oval, polygonal, heart-shaped, preferably round.

It is also advantageous that the click plate spontaneously generates a clicking sound when reaching a predetermined deformation in one direction.

A further advantage is to be seen in the arrangement of a circumferential oscillatory bridge on the first force transmission means.

It is further advantageous that the click plate moves back independently in an elastic manner when the impact of the force weakens, and is arranged coaxially to the first force transmission means.

It is also advantageous that at least one spring element is arranged laterally to the flat spring element.

A further advantage is to be seen in that at least one elevation on the plane of the base plate cooperates with at least one protrusion on the inner side of the first force transmission means in such a way that they engage with one another, wherein at least one spring element is under a specified pretension.

It is further advantageous that at least one elevation on the base plate and at least one protrusion on the inner side of the first force transmission means receives at least one pressure spring.

An advantageous formation is to be seen in that elevations and protrusions are formed as guide elements, which define the lifting of the first force transmission means on the one hand, and which secure the first force transmission means against rotation on the other hand.

It is also advantageous that the flat click plate rests loosely on the edge of the click plate at least on three narrow support points.

A further advantage is to be seen in that the lateral oscillatory bridges have recesses, which have different moldings, e.g. angular or curved.

It is further advantageous that a molded foam, the surface of which is formed convexly, is arranged on the outer side of the base plate.

It is also advantageous that the cover surface of the first force transmission means is formed concavely, wherein the cover surface can have at least one curvature.

It is further advantageous that the method for generating a clearly audible sound when an external force K acts on a first force transmission means, which, via a spring system, acts on a base plate in an apparatus for the controlled cardio-pulmonary resuscitation of the human body in the event of cardiac arrest, is characterized in that a clearly audible signal S is generated, which is transmitted to oscillatory elements, when reaching a settable limit pressure $K_{max}$.

Further features, which are essential for the invention, can be gathered from the description and the dependent claims.

BRIEF DESCRIPTION OF THE DRAWINGS

The invention will now be described in more detail below on the basis of drawings.

Figure 1A:
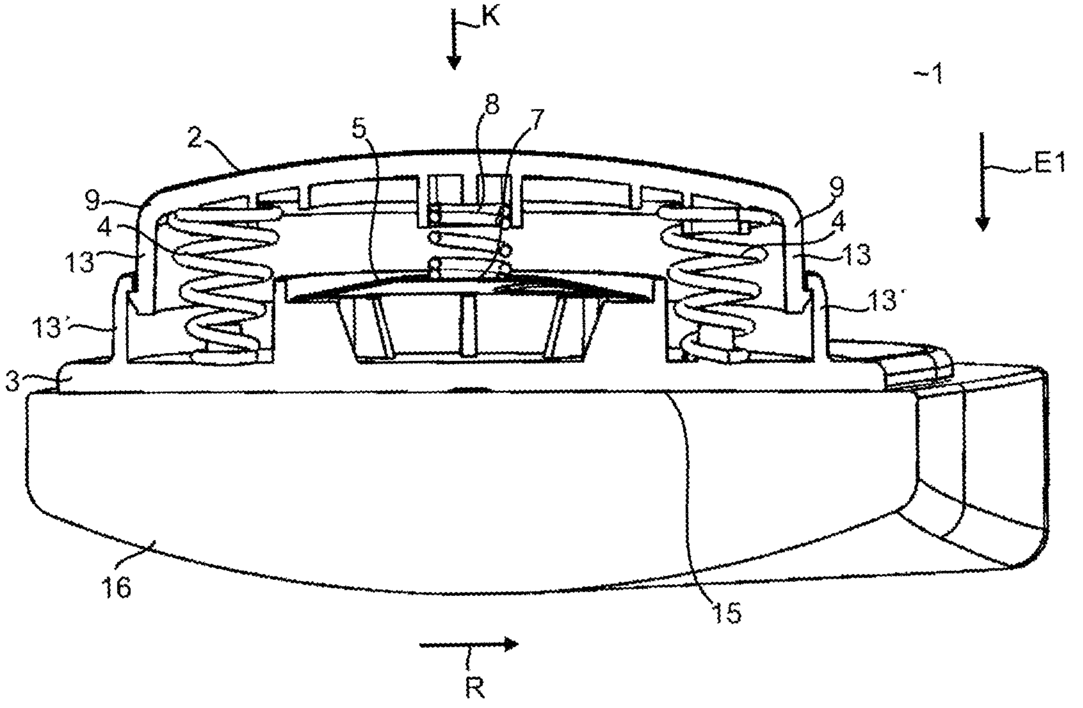
FIG. 1A shows a lateral sectional illustration of a first exemplary embodiment of the device described herein.
Figure 1B:
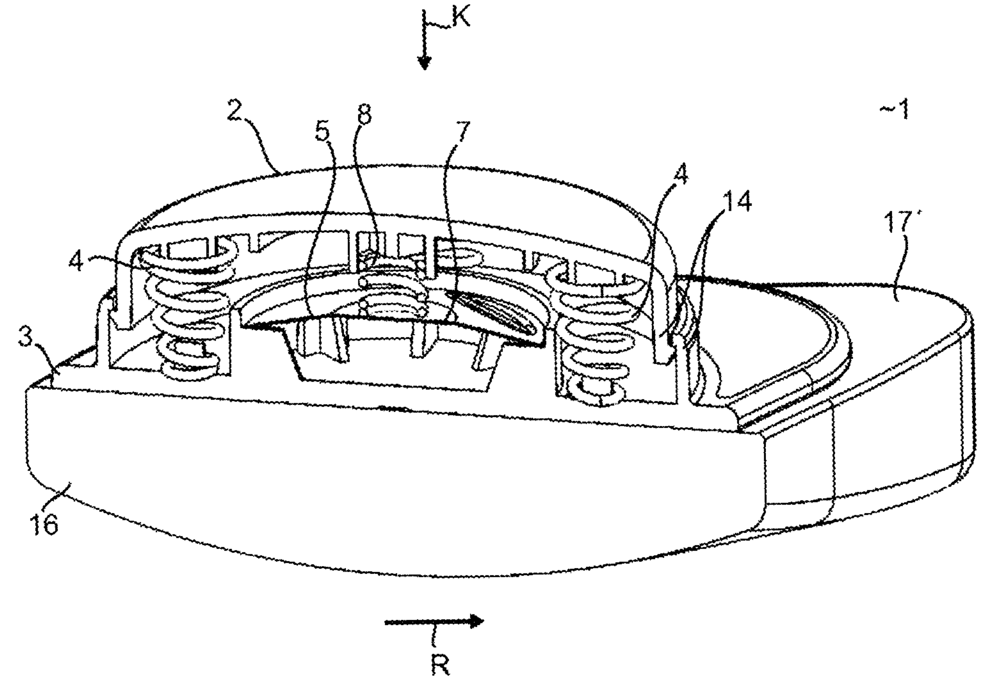
FIG. 1B shows the exemplary embodiment of FIG. 1A in a schematically perspective sectional illustration.
Figure 1C:
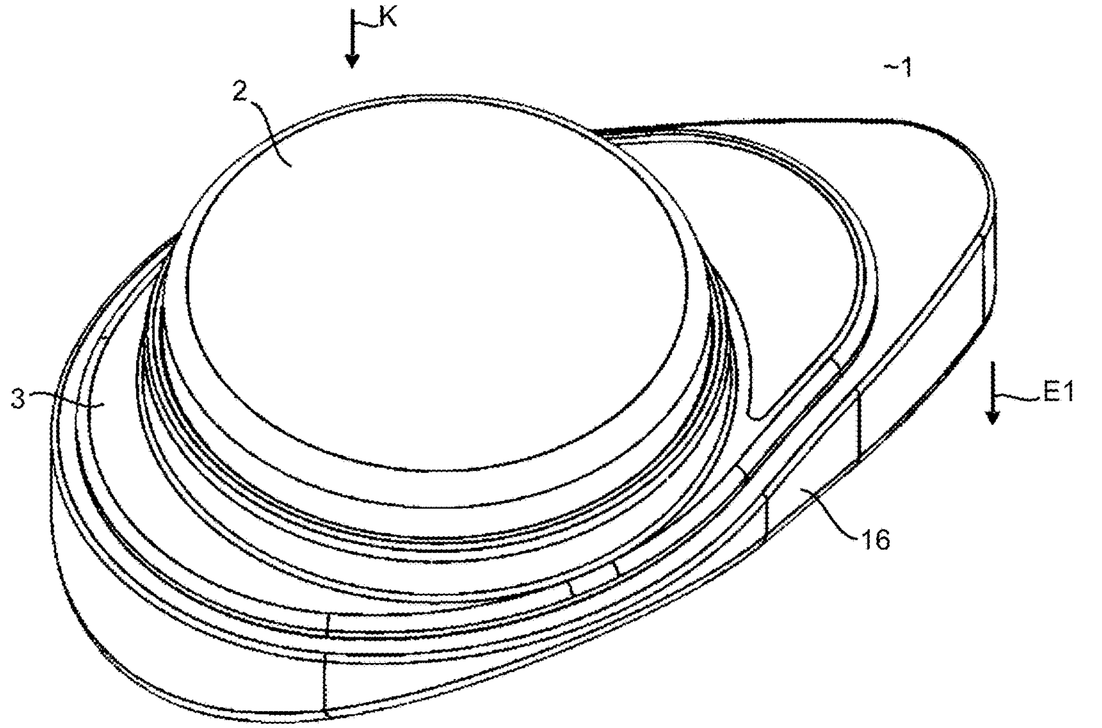
Figure 1D:
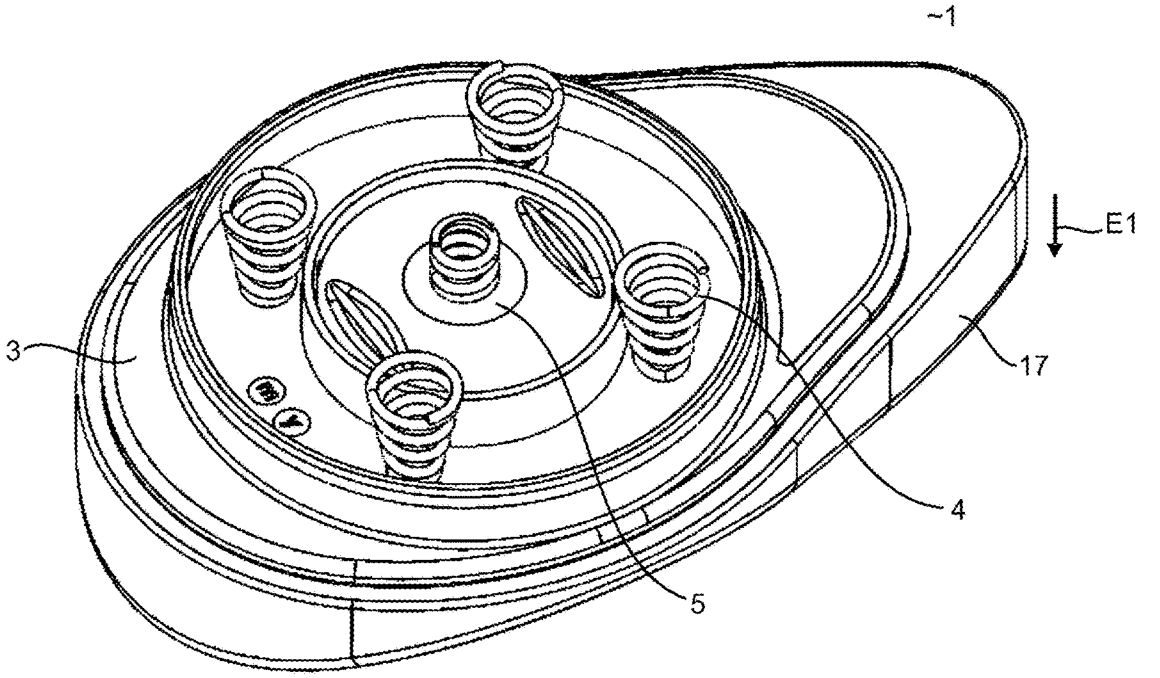

A top view of the exemplary embodiment 1A and 1B is shown from FIGS. 1C and 1D.

Figure 2A:
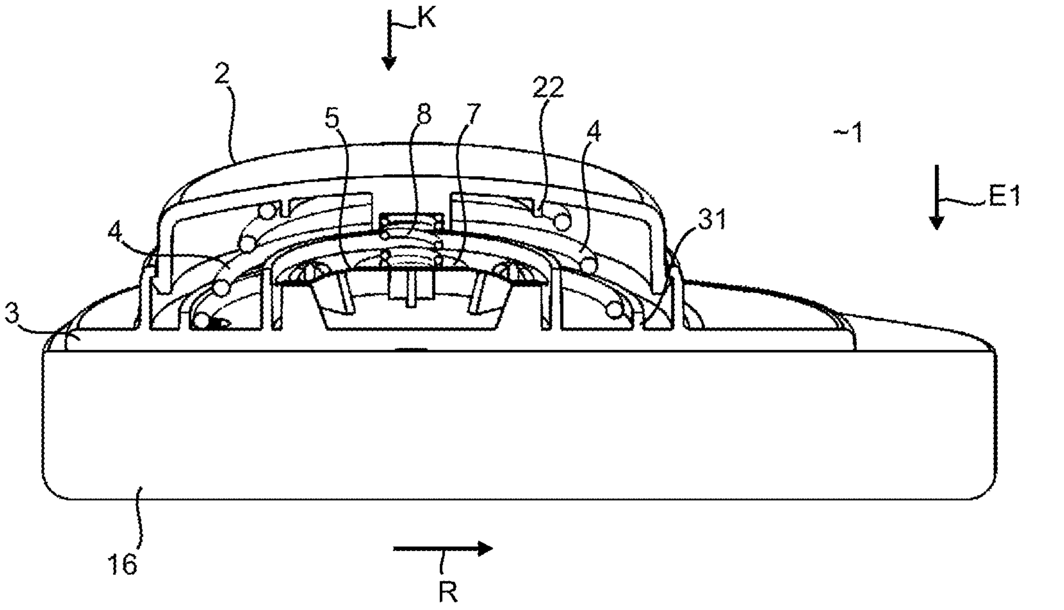
Figure 2B:
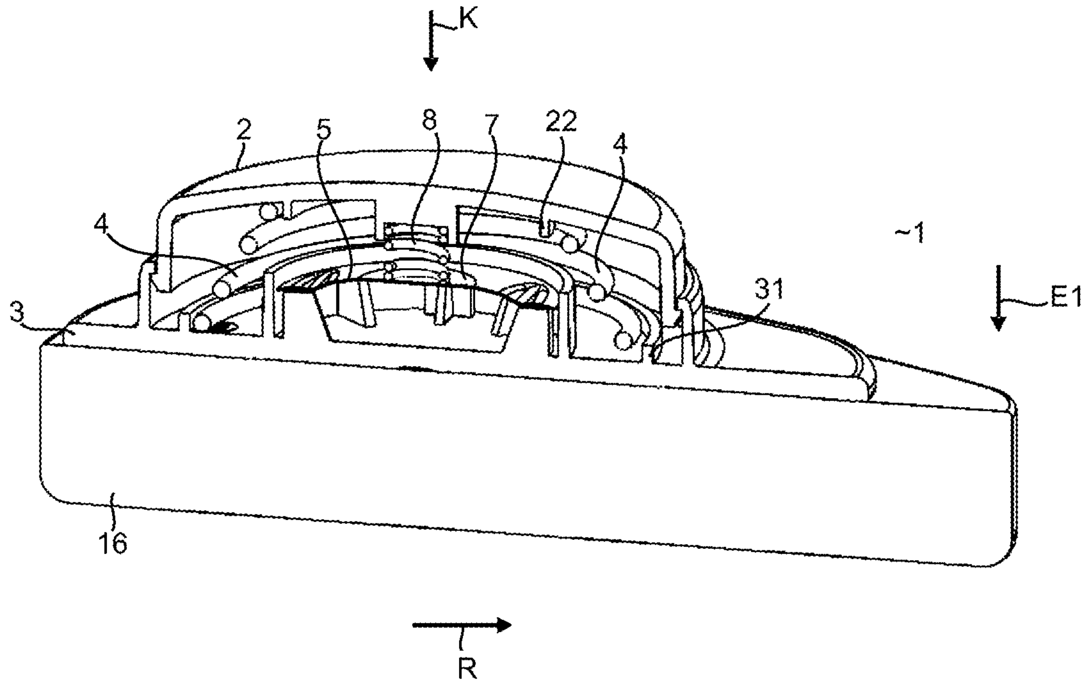

A further exemplary embodiment is shown in FIGS. 2A and 2B in perspective side view.

Figure 2C:
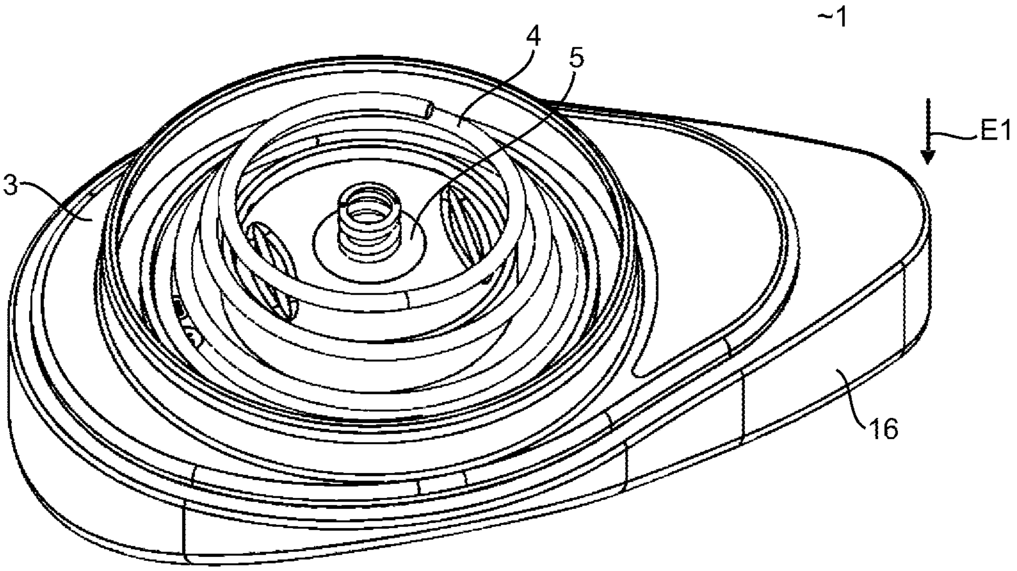

FIG. 2C illustrates the further exemplary embodiment of FIGS. 2A and 2B in the top view.

In contrast to the exemplary embodiment of FIGS. 1A-1D, only a single, central spring can be seen in FIGS. 2.

A first exemplary embodiment of a device 1 described here is shown in FIG. 1A.

DETAILED DESCRIPTION OF THE INVENTION

It can in particular be seen that a multi-part device 1 for generating a clearly audible sound when an external force (K) acts on a first force transmission means 2, which, via a spring system 4, 5, 8, acts on a base plate 3 in an apparatus for the controlled cardio-pulmonary resuscitation of the human body in the event of cardiac arrest, is designed in such a way that the outer geometric dimensions and shapes are adapted to the anatomical conditions of the thorax close to the sternum, in particular wherein the spring system 4, 5, 8 generates a signal, which acts on at least one oscillatory element 8, wherein the spring system 4, 5 is arranged between the first force transmission means 2 and the base plate 3, which spring system consists essentially of at least one spring element 4 and a flat-formed spring element 5, further wherein the spring element 4 is a conical spring element.

More precisely, a total of four spring elements 4 are arranged along a circular path laterally from the flat-formed spring element 5, which is in preferably a click plate 5, along a circular path. Each of the spring elements 4 is formed conically.

All spring elements 4 are furthermore arranged conically between the first force transmission means 2 and the base plate 3 in such a way that a spring cross section of the spring element 4 decreases conically, starting at the force transmission means 2 in the direction towards the base plate 3.

In addition, the spring element 8, which is a further spring element 8, is arranged between the flat-formed spring element 5 and the force transmission means 2, so that a pressure applied externally to the force transmission means 2 is at least partially transmitted to the flat-formed spring element 5 via the spring element 8.

FIGS. 1B to 1D show the device shown in FIG. 1A in schematically perspective views.

The force K to be exerted on the first force transmission means 2 generally lies between 35 and 45 kg, preferably at approx. 40 kg, which is necessary in order to be used effectively during the resuscitation of the cardio-pulmonary function. In a preferred exemplary embodiment, there are four helical springs 4, which are arranged around the click plate 5, on a specified circular path. The spring constant or spring rate R of the spring element 4 may be approximately 8.861 N/mm. The helical spring 4 is sharpened at the upper and lower supports, in order to obtain a defined bearing surface on the base plate 3 and the first force transmission means 2.

The diameter of the circular path, on which the spring elements 4 are arranged, preferably does not exceed 100 mm, so as not to design the geometric dimensions of the entire device to be too large, which is essentially determined by means of the anatomical dimensions of the thorax of the human body and the operational safety.

The diameter of the flat click plate 5 lies approximately between 30 mm and 55 mm, and rests in a quasi punctiform manner with its edge region 22 on the circumference on at least three support points 10, which rise from the plane of the base plate 3.

In the middle region, the click plate 5 has at least one curvature 7, on the upper point of which at least a second oscillatory element 8, thus the further spring element 8, is arranged with its one end.

A second end is supported in a friction-locked manner on a bottom surface of the first force transmission means 2.

The first force transmission means 2 has an approximately U-shaped cross section, such that the two legs of the U-shaped cross section or elevations, respectively, from the plane of the bottom side of the first force transmission means 2, is formed as at least an, in particular acoustically, oscillatory part 8 (see further below), which absorbs the acoustic waves generated by the click plate 5 and transmits them to the outside.

In the assembled state, all of the spring elements 4, 5, 8, which are arranged between the base plate 3 and the first force transmission means 2, have a certain pretension, which is generated because the first force transmission means 2 and the base plate 3 each have an elevation 13, 13' including a snap closure 14 on the end of the elevation. The snap closure 14 may further include a guide providing a degree of freedom directed longitudinally, in which a hook forming part of the elevation 13 moves.

When bringing together the first force transmission means 2 and the base plate 3, the two ends of the respective elevations interlock all the way to a predetermined stop, so that in the assembled state, all of the individual spring elements 4, 5, 8 have a certain predetermined pretension, which ultimately have a resulting compressive force of approx. 40 kg as a result of the cooperation between the individual spring elements, which is necessary to guide the click plate 5 to the limit value for the "break-through" of the click plate 5, in response to which it generates a clearly perceivable sound, which is transmitted essentially to the lateral oscillatory parts on the first force transmission means 2 and which is amplified by means of modulation of the acoustic waves at the oscillatory parts 9, reaching acoustic waves, as a result of overlapping of the various wave ranges in the audible range, so that, as a result, a clearly audible signal rings out when reaching the predetermined force $K_{max}$ of approximately 40 kg. In response to the withdrawal of the exerted force K on the first force transmission means 2, the click plate 5 or signal-generating unit 5, respectively, moves back independently into its initial position by emitting a further signal.

A molded part 16 is arranged on a bottom side 15 of the base plate 3. The molded part 16 consists of a suitable foam, such as, for example, a foam rubber, which takes an elastic effect on the one hand, and which is moisture absorbing on the other hand, and which develops a certain adhesiveness on the naked skin as a result of its material properties and pore size, which has a particularly favorable effect during the treatment of the patient.

Due to the elastic effect of the foam of the molded part 16, this spring force is to be included into the calculation of the total force of approx. 40 kg for generating the first audible signal. The surface of the molded part 16 resting on the naked skin of the patient is essentially adapted to the anatomy of the thorax in the region of the sternum.

In the top view, the molded part 16 is formed in a pear-shaped manner, wherein the thinner end 17' of the foam part 16 should correspond approximately with the position of the lower end of the sternum during the treatment of the patient, in order to take the optimal effect during the resuscitation of the patient.

A further exemplary embodiment of a device 1 described here is illustrated schematically in FIGS. 2.

It can be seen that, in contrast to FIGS. 1, the device 1 introduced in FIGS. 2 has a single spring element 4, namely a single central spring element 4, which encloses the flat spring element 5, wherein the spring element 8 is still installed, thus in the same manner as in FIGS. 1.

In its spring cross sectional surface, the central spring element 4 tapers in the direction of the force transmission element 2, starting at the base plate 3.

An end connected to the base plate 3 is fitted in an enclosure 31, so that this end is limited by means of the enclosure 31 in the radial direction R (parallel to the horizontal direction) and is thus stabilized mechanically. The lower end of the spring element 4 can thus not slip away to the outside or shift in the radial direction R.

The further end of the spring element 4 is fixed by means of an inner enclosure 22. In this exemplary embodiment, the inner enclosure 22 is thereby arranged within the spring cross section. However, both enclosures 22 and 31 follow a circular path, but with different radii. This is so, because in this particular exemplary embodiment, the radius of the circular path of the enclosure 22 is in smaller than the radius of the enclosure 31. However, both enclosures share the same axis of symmetry. The axis of symmetry thereby runs perpendicular to the radial direction and thus parallel to the spring deflection direction E1 of all springs.

FIGS. 2B to 2C show the exemplary embodiment shown in FIG. 2A in schematically perspective views.

The invention is not limited by the description on the basis of the exemplary embodiments. On the contrary, the invention captures every new feature as well as every combination of features, which in particular includes every combination of features in the patent claims, even if this feature or this combination itself is not specified explicitly in the patent claims or in the exemplary embodiments.

List of Reference Numerals

1 device
2 force transmission means
3 base plate
4 spring element
5 flat-formed spring element/click plate/signal-generating unit
7 curvature
8 oscillatory spring element
9 oscillatory part
10 support points
13 elevation
13' elevation
14 snap closure
15 bottom side
16 molded part
17' thin end
22 edge region/inner enclosure
31 enclosure
R radial direction
K force
E1 spring deflection direction

The invention claimed is:

1. A multi-part device for generating a clearly audible sound when an external force acts on a first force transmission means, which, via a spring system, acts on a base plate in an apparatus for the controlled cardio-pulmonary resuscitation of the human body in the event of cardiac arrest, wherein the multi-part device comprises:

outer geometric dimensions and shapes of the multi-part device that are adapted to the anatomical conditions of the thorax close to the sternum;

the spring system that generates a signal, which acts on at least one oscillatory element; wherein:

the spring system is arranged between the first force transmission means and the base plate, said spring system comprising at least one helical spring element and a flat-formed spring element; and the helical spring element is a conical spring that forms a helix that increases or decreases from a first end to a second end thereof.

2. The multi-part device according to claim 1, wherein the at least one helical spring element is arranged on a circular path laterally from the flat-formed spring element, and the flat-formed spring element is a click plate.

3. The multi-part device according to claim 1, wherein the device comprises at least two additional helical spring elements, which each arranged laterally from the flat-formed spring element.

4. The multi-part device as claimed in claim 3, wherein each of the additional helical spring elements are conical spring elements.

5. The multi-part device as claimed in claim 1, wherein the at least one helical spring element is arranged conically between the first force transmission means and the base plate in such a way that a spring cross section of the helical spring element increases or decreases conically, starting at the force transmission means in the direction towards the base plate.

6. The multi-part device as claimed in claim 1, wherein the at least one helical spring element is a single helical spring element, wherein in a radial direction an end of the spring element, which is connected to the base plate, encloses and surrounds the flat-formed spring element in the radial direction.

7. The multi-part device as claimed in claim 1, wherein the helical spring element is arranged between the flat-formed spring element and the force transmission means, such that a pressure applied externally to the force transmission means is at least partially transmitted to the flat-formed spring element via the helical spring element.

8. The multi-part device as claimed in claim 1, wherein an end of the at least one helical spring element, which is connected to the force transmission means, has such a radial cross section that this end encloses and surrounds the spring element in the radial direction.

9. The multi-part device as claimed in claim 1, wherein the device is free from further spring elements away from an axis of symmetry which runs through the flat-formed spring element in the radial direction.

10. A method for generating a clearly audible sound when an external force K acts on an apparatus for the controlled cardio-pulmonary resuscitation of the human body in the event of cardiac arrest, the method comprising:

providing a device comprising a force transmission means, a spring system, and a base plate;

applying a first force K to the force transmission means; generating a clearly audible signal and transmitting said signal to oscillatory elements, via the spring system, when reaching a settable limit pressure $K_{max}$;

the spring system is arranged between the force transmission means and the base plate, said spring system comprising at least one helical spring element and a flat-formed spring element; and the helical spring element is a conical spring that forms a helix that increases or decreases from a first end to a second end thereof.

* * * * *